June 21, 1966　　　　J. P. MILLER　　　　3,256,957
ZERO-GRAVITY LUBRICATION SYSTEM

Filed Oct. 11, 1963　　　　　　　　　　2 Sheets-Sheet 1

INVENTOR.
Joseph P. Miller
BY
E. W. Christen
ATTORNEY

June 21, 1966   J. P. MILLER   3,256,957
ZERO-GRAVITY LUBRICATION SYSTEM
Filed Oct. 11, 1963   2 Sheets-Sheet 2
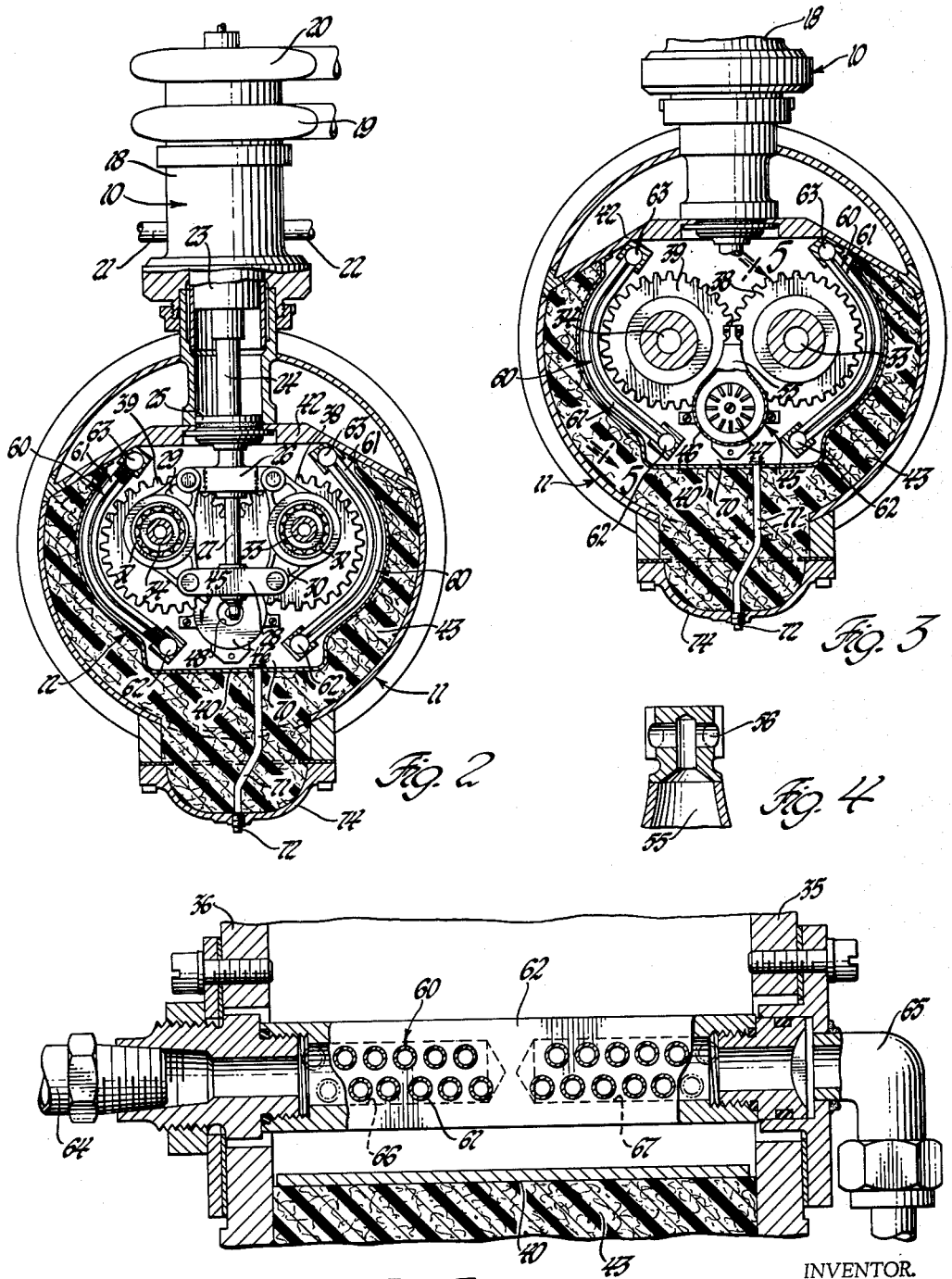
INVENTOR.
Joseph P. Miller
BY
E. W. Christen
ATTORNEY

United States Patent Office 3,256,957
Patented June 21, 1966

3,256,957
ZERO-GRAVITY LUBRICATION SYSTEM
Joseph P. Miller, Indianapolis, Ind., assignor to General Motors Corporation, Detroit, Mich., a corporation of Delaware
Filed Oct. 11, 1963, Ser. No. 315,568
5 Claims. (Cl. 184—6)

This invention relates to a lubrication system for mechanical mechanisms operating in a gravity-free environment.

Outer space environments present problems in all fields of engineering not encountered on the ground. Aside from compensation for variations in temperature and pressure, systems operating in outer space must be engineered for weightlessness.

Engine lubrication systems on the ground commonly employ an oil pan or sump which serves as a reservoir for the oil requirements of the engine. An oil pump having an inlet in the sump delivers oil under pressure to the various engine components requiring lubrication. The oil drains back to the sump under the influence of gravity and is recirculated.

Image the case where a reciprocating engine is designed to drive generators for producing electrical power to operate the systems of a satellite. Under such conditions, a conventional engine lubrication system would fail. Instead of the oil being pumped by the oil pump into the remote regions of the engine and then draining back to the oil pan under the influence of gravity, in a weightless environment the oil will stick to the walls of the crankcase and to the moving parts of the engine until flung off by the rotative forces, floating around in the crankcase then until it collides with an engine part or is absorbed by some other oil mass. The oil pan will become virtually empty except for a layer of oil clinging to the bottom and the side walls leaving the drive linkages of the engine rotating in a void or ullage space constituting the swept volume of the crankthrows and other rotative elements of the drive.

This invention is concerned with a solution to the zero-gravity lubrication problem. Originally it was believed that there must be a sufficient volume of oil in the crankcase to fill all of the unswept volume within the crankcase and have a finite amount left over to lubricate the wearing surfaces. In other words, it was assumed that if you put enough oil in to satisfy the unswept volume, and then added a finite amount sufficient to lubricate the engine, this additional amount of oil would be struck by the crankthrows for example to provide splash lubrication. Unfortunately, droplets of oil formed by splash behave in a surprising manner in a weightless system. They move at random in the ullage space until they strike something such as a crank cheek or other surface which requires no oil. Hence, little positive lubrication of the vital parts of the engine drive is possible with splash lubrication.

A reciprocating piston engine operates substantially the same in airless space as it would on the ground except for having its own working fluid hermetically sealed into it, but the effect of weightlessness on liquids in outer space requires a new solution if the engine bearing surfaces are to be adequately lubricated.

In accordance with the invention it has been determined that the volume of oil required to lubricate in a weightless environment is considerably less than the unswept volume of the crankcase if it is properly designed. With respect to the unswept crankcase volume, the ullage space will form generally in an ellipsoid owing to the novel shape of the crankcase walls with the oil wetting the walls and forming large "fillets" at the four corners of the unswept volume. This may be explained on the basis of oil surface tension forces which predominate in outer space. During operation, the drive linkages disrupt the surfaces of the oil sending oil particles ricochetting from one place to another producing an oil fog. To positively lubricate the vital engine parts, a centrifugal blower driven from the engine crankshaft is located so that the eye of its impeller is in the ullage space of the crankcase creating a partial vacuum there tending to draw the oil mist into a vortex. The blower housing includes spray nozzles on the high pressure side of the impeller so that the oil mist is pressurized behind the nozzles and directed toward the crankshaft main bearings.

A more detailed understanding of the invention may be had by referring to the following description and drawings wherein:

FIGURE 2 is a view along line 2—2 of FIGURE 1 through the center of the engine;

FIGURE 3 is a view along line 3—3 of FIGURE 1;

FIGURE 4 is an enlargement of a portion of the blower housing showing the spray nozzles; and FIGURE 5 is a sectional view of one of the oil heat exchanger units taken along the line 5—5 of FIGURE 3.

Figure 1:
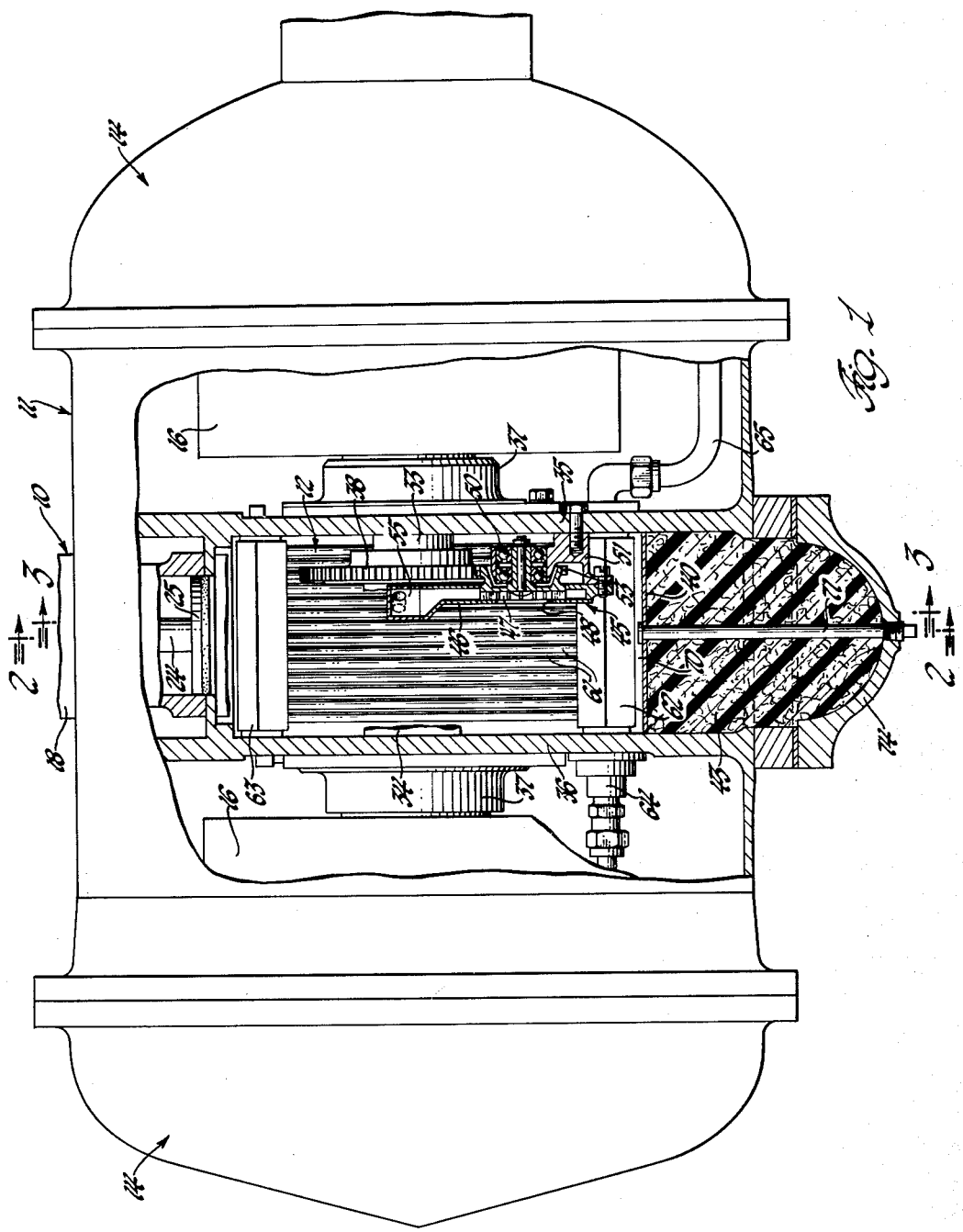
FIGURE 1 is a broken away side view of the crankcase area of an engine embodying the inventive lubrication system.

Referring to FIGURE 1, a portion of a Stirling cycle engine 10 is shown mounted centrally within a casing 11 providing a hermetically sealed crankcase area 12. At opposite ends of the casing 11 are joined bell housings 14 which provide enclosures for electrical generators 16 driven by the engine.

As seen in FIGURE 2, the Stirling cycle engine 10 includes a cylinder 18 which accommodates a displacer and power piston and has inlet and outlet hot fluid manifolds 19 and 20 respectively for supplying the external heat to run the engine. Water cooler inlets and outlets 21 and 22 connect with a radiator (not shown) for extracting heat from the cold space of the engine. The power piston 23 is shown connected to the power piston shaft 24 reciprocating in a shaft seal assembly 25 and terminating in a power piston yoke 26. The displacer piston, which is hidden from view, is connected to a displacer piston shaft 27 reciprocable within the power piston shaft 24 and terminating in a displacer piston yoke 28. The yokes 26 and 28 are pinned to the power and displacer piston connecting rods 29 and 30 journaled on anti-friction bearings 31 at the crank arms of the two counter-rotating crankshafts 33 and 34 of the rhombic drive. As shown in FIGURE 1, the crankshafts 33 and 34 extend in opposite directions through the bulkhead walls 35 and 36 which carry main bearing plates 37 for journaling the crankshaft ends that are coupled to the armatures of the generators 16. Synchronizing gears 38 and 39 mounted on the crankshafts 33 and 34 maintain synchronization of the counter-rotating shafts.

Within the hermetically sealed crankcase area 12, as seen in FIGURES 1 through 3, an inner vessel 40 is attached near the top to a web 42 through which the cylinder 18 opens. The space between the casing 11 and the inner vessel 40 is filled with an epoxy material 43 adapted to withstand the crankcase pressures and provide an enclosure inwardly defined by the vessel 40 serving to confine the lubricant and artificial atmosphere of the system. The artificial atmosphere referred to may be helium gas, for example, identical to that of the working fluid of the engine.

The configuration of the vessel 40 is important since during conditions of weightlessness, lubricant in the crankcase will cling to its surfaces and to the undersurface of the web 42 leaving generally an ellipsoidal ullage space at the center with larger oil masses at the corners. The shape of the vessel 40 defines the maximum unswept volume allowed in the crankcase for proper lubrication of a rhombic type of drive. There are no unnecessary pockets or depressions in the vessel within which the oil could hide, with the result that the drive, operating largely within the ullage space, is caused to continuously strike the oil masses. In the process, bodies of oil will be set in motion within the ullage space which collide with the drive linkages splattering the oil and causing an oil-gas mist or fog mixture to form.

Normally this splash lubrication would be sufficient, but at zero-gravity liquids behave in a strange fashion. Under weightless conditions the oil will appear more viscous, clinging to whatever it touches. The oil particles in the oil-gas mixture will tend to collect on exposed surfaces which require no lubrication leaving the more enclosed bearing surfaces somewhat oil deficient. To correct this, positive lubrication of the vital bearing surfaces is necessary.

As seen in FIGURES 1, 3 and 4, mounted within the ullage space is a centrifugal blower 45 which includes a housing 46 closely surrounding an impeller 47 which is journaled on anti-friction bearings 50 mounted within a boss 51 bolted to the bulkhead 35. An impeller drive gear 53 engages the synchronizing gear 38 driving the impeller at some ratio to engine speed. The housing 46 necks down at the top forming a collector 55 for the oil-gas mixture on the high pressure sides of the impeller. The oil mist in the ullage space will be drawn into a vortex at the eye of the impeller 47 through an opening 48 and pressurized within the collector. The collector or constriction 55 is formed with a pair of spray nozzles 56 having jets directed toward the connecting rod bearings 31 for positive lubrication on their raceways. The oil requirements in the yoke pins and other areas of the drive, being less than the main bearings, is satisfied by a combination of splash and spray from the nozzles. No lubrication of the upper cylinder head region is required, a dry seal being effective between the pistons and the cylinder.

In outer space, it is difficult to get rid of heat once it builds up since there is insufficient atmosphere to absorb it, hence oil cooling is needed. In the invention, the oil is cooled by the heat exchanger units 60 on either side of the vessel 40 which include coils 61 connecting between oil cooler water manifolds 62 at the bottom and 63 at the top. The heat exchangers are identical and, as seen in FIGURE 1, each has a water inlet 64 connected through the left bulkhead wall 36 with the lower manifold 62; a water manifold outlet 65 connects with the opposite end of the manifold 62 through the right bulkhead 35.

Referring to FIGURE 5, the manifold 62 is counter-bored forming an inlet passage 66 and an outlet passage 67. The cooling tubes 61 connecting with the inlet passages 66 carry water from the inlet 64 upwardly into the manifold 63 where a single chamber is provided for the communication between the inlet 64 and outlet 65. Water on the way to the outlet 65 from the manifold 63 is carried downwardly by the cooling tubes 61 emptying into the outlet passage 67 and then directly into the outlet 65. Heated water is then circulated through the engine radiator where much of the heat is dissipated in space.

The exchanger units are also shaped to conform to the swept volume of the drive mechanism to provide more surface area in contact with the oil. During operation the drive linkage will disrupt the surface of the oil due to dimensional interference in the oil "fillet" areas particularly, which action also disturbs adjacent areas of oil hovering around the cooling tubes 61. In this way, the oil is agitated all along the cooling tubes to cause more efficient cooling and in effect to cause the unswept volume to be saturated. In other words, it is not necessary that the volume of oil equal the unswept volume plus a finite lubricating amount in addition, but instead, satisfactory lubrication at zero gravity is achieved by a volume of oil less than 50% of the unswept volume space since this space is "filled" by the peculiar agitation phenomenon observed in conditions of weightlessness. To take advantage of this it is necessary to eliminate any hidden pockets within the crankcase and to contour the inside to conform as nearly as possible to the swept volume of the crank linkages. The inner-vessel 40 is shaped to achieve such a result for a rhombic drive. Of course, the type of drive selected or the particular engine used is of no consequences insofar as the invention is concerned. For example, an internal combustion engine may be adapted for outer space applications in which case the swept volume space would be entirely different and consequently require a different inner-crankcase vessel design.

The lower portion of the vessel 40 is formed with a shallow oil sump 70 which is connected with an oil filler tube 71 closed by a plug 72 in the closure member 74 of the casing 11. Tube 71 is provided to either fill or drain the oil from the hermetically sealed crankcase when the engine is on the ground at which time the oil level would be slightly below the eye of impeller 47.

The engine can be operated on the ground also since exaggerated splashing of oil in the sump by the impeller and drive linkages insures adequate lubrication of the bearings.

Having now described my invention in detail, it is intended that obvious modifications will be covered within the scope of the appended claims.

I claim:

1. A zero-gravity lubrication system for apparatus of the class described having a drive mechanism with bearing surfaces requiring lubrication, said lubrication system comprising;
  a vessel containing said drive mechanism and having an internal contour close to and conforming to the swept volume thereof;
  a metered quantity of lubricant within said vessel and occupying the peripheral regions thereof during zero gravity operating conditions so as to cause dimensional interference with the drive mechanism; and
  blower means operative within said vessel and having an inlet means adjacent the swept volume of the drive mechanism and an outlet means aimed at the bearing surfaces to be lubricated whereby droplets of lubricant splashed up by the drive mechanism are drawn into the blower means and directed onto said bearing surfaces to provide positive lubrication therefor.

2. A zero-gravity lubrication system for an engine having a crankcase adapted for housing the engine drive mechanism and comprising;
  an inner-crankcase vessel having an internal contour close to and conforming to the swept volume thereof;
  a metered quantity of lubricant within the vessel of a volume substantially less than the unswept volume thereof and occupying the peripheral regions of the unswept volume during zero gravity conditions so as to cause dimensional interference with the drive mechanism;
  blower means being operatively connected to said drive mechanism and having an inlet means adjacent the swept volume of the drive mechanism, said blower means having a constriction on the high pressure side thereof; and
  spray means formed in the constriction and directed toward said drive mechanism whereby droplets of lubricant splashed up by the drive mechanism are drawn into the blower means and directed onto parts of the drive mechanism by the spray means to provide positive lubrication.

3. A zero-gravity lubrication system for a reciprocative engine having an hermetically sealed crankcase adapted for housing the engine drive mechanism and comprising;
  an inner-crankcase vessel having an internal contour close to and conforming to the swept volume thereof;

a metered quantity of lubricant within the vessel of a volume less than the unswept volume thereof and occupying the peripheral regions of the unswept volume so as to cause dimensional interference with the drive mechanism;

a centrifugal blower having an impeller operatively driven by said drive mechanism, said blower including a housing having inlet means adjacent the swept volume of the crankcase and having a constriction on the high pressure side of said impeller; and a spray nozzle aimed at said drive mechanism formed in said constriction whereby droplets of lubricant splashed up by the drive mechanism are drawn into the blower and directed onto parts of the drive mechanism by the spray nozzle to provide positive lubrication.

4. A lubrication system according to claim 3 wherein the metered quantity of lubricant is less than 50% of the difference in volume between the unswept volume and the swept volume.

5. A lubrication system according to claim 3 wherein heat exchanger units are provided within the inner-crankcase vessel to cool the oil, said units being shaped to conform to the maximum swept volume within said vessel.

References Cited by the Examiner

UNITED STATES PATENTS

| | | | |
|---|---|---|---|
| 1,824,540 | 9/1931 | Gronkwist | 184—6 |
| 2,845,141 | 7/1958 | Mauck et al. | 184—6 |

LAVERNE D. GEIGER, *Primary Examiner.*

MILTON KAUFMAN, *Examiner.*

H. BELL, *Assistant Examiner.*